United States Patent Office 2,716,641
Patented Aug. 30, 1955

2,716,641

PROCESS OF POLYMERIZING OLEFINICALLY UNSATURATED COMPOUNDS

Franciscus Johannes Fredericus van der Plas and Christiaan Pieter van Dijk, Amsterdam, Netherlands, assignors to Shell Development Company, Emeryville, Calif., a corporation of Delaware No Drawing. Application October 9, 1951,
Serial No. 250,574

Claims priority, application Netherlands
October 27, 1950

12 Claims. (Cl. 260—91.7)

This invention relates to a process of polymerizing olefinically unsaturated compounds, and in particular, is an improvement of the process described and claimed in our copending application, Serial No. 201,536, now U. S. Patent No. 2,618,626, filed December 19, 1950. This copending application describes a process wherein drops of monomer of one or more olefinically unsaturated compounds to be polymerized are conducted through an aqueous medium containing an emulsifying agent and water-soluble polymerization catalyst. The movement of the drops is due primarily to the difference in density of the drops and the aqueous medium. The monomer drops which have passed through the aqueous medium separate and collect into an integral monomer phase which is maintained in contact with the aqueous phase. The unpolymerized compound collected in the integral monomer phase is generally transported in continuous fashion outside the chamber filled with the aqueous phase back to the point of supply for the drops. The polymer which forms during passage of the monomer drops therethrough remains as a very stable emulsion in the aqueous medium.

One great advantage realized by the process described in our copending application is control of polymerization temperature which is attained by cooling the circulating monomer phase in the portion of the circuit external to the polymerization reactor. Thus the complications arising from necessity of having customary cooling coils in the polymerization reactor or cooling through the wall of the reactor are obviated. In addition, the circulation of monomer serves several other purposes, namely, gentle agitation of the aqueous polymerization medium, supplementation of the monomer converted to polymer which is effected by adding fresh monomer to the external portion of the circulating monomer stream, and control of the concentration of monomer dissolved in the aqueous medium.

It is desired as a matter of practical utility for the product that polymer of very high molecular weight be produced by the process. In order to achieve this result, it is necessary that the concentration of monomer dissolved in the aqueous medium be high. Since the concentration of monomer dissolved in the aqueous medium is dependent upon the rate of diffusion from the moving drops into the aqueous medium, it is necessary, in order to obtain the needed high concentration of dissolved monomer, to circulate a large amount of monomer per unit of volume of the aqueous medium and per unit of time. In many cases, a greater amount is required to be circulated for this purpose than is needed for cooling and agitation.

We have now discovered that by not only having the large drops of monomer moving through the aqueous phase, but also having present therein emulsified droplets having diameters of the order of magnitude of 0.1 to 0.001 mm. and smaller, a marked improvement in the process is realized. This improved invention also embraces supplementing the monomer converted to polymer, either wholly or partly, by adding an emulsion of monomer in water, again wherein the monomer droplets are of the order of magnitude of 0.1 to 0.001 mm. and smaller.

In the present improved method, as preferably applied, the maintenance of the needed high concentration of monomer dissolved in the aqueous medium is completely or partly taken over by the presence of monomer emulsified in water. In this way, it is possible to obtain polymer of high molecular weight independent of the amount of monomer in circulation. Additionally, supplementation of monomer and cooling can be regulated quite independently of each other. Furthermore, it is not necessary to use circulating pumps of very great capacity.

For best results, the monomer employed in emulsified form has very finely dispersed droplets and a high degree of stability. A stable monomer emulsion has no detrimental effect on the separation of the monomer traversing the aqueous medium in large drops. Furthermore, fine dispersions of monomer promote diffusion very considerably. It is, therefore, advisable to make use of emulsions obtained by mixing the monomer with such a quantity of concentrated emulsifier solution in water that a gelatinous mass is formed, and then mixing additional water with the jellied mixture so as to obtain a stable aqueous emulsion of monomer. For this purpose, liquid monomer is mixed with about 5% to 20% of an aqueous solution containing about 10% to 35% of an emulsifying agent to thereby form a jellied mixture, and water is then added to the jelly so that an emulsion is obtained which may contain about 20% to 50% of monomer. Preparation of such stable monomer emulsions are fully described in Patent No. 2,479,241. The diameter of the droplets in the aqueous monomer emulsion used in the process is preferably not larger than 0.01 millimeter.

According to the present invention, drops of monomer of an olefinically unsaturated compound are introduced into submerged contact with a liquid aqueous medium containing monomer of the compound in emulsified form as well as a polymerization catalyst and an emulsifying agent, and the drops are conducted through the aqueous medium, the movement of drops through the medium being affected by and due to a difference in density of the drops and the medium. If the monomer drops are lighter than the aqueous phase, the drops flow upwards by reason of the buoyancy of the drops in the aqueous medium. Similarly, if the drops are heavier than the aqueous phase, the drops flow downwards. The aqueous medium contains a substantial proportion of emulsified monomer, i. e., at least 1% by weight and may contain up to about 50% by weight of monomer in emulsified form. The polymerization product appears as an emulsified suspension of polymer in the aqueous phase.

The process is conveniently effected in a reaction chamber which is in the form of a vertical column. The column is nearly filled with the aqueous medium. Drops of the monomeric compound are introduced into contact with the aqueous medium in continuous fashion with the aid of an entering means which is preferably a distributing device containing a plurality of apertures through which monomer enters into contact with the aqueous medium. The entrance aperture or apertures can have a diameter of say 0.2 to 20 millimeters, and are usually of about 2 to 10 millimeters size. The entering means is placed at one end of the reaction chamber so that the drops flow away from it. At the opposite end, the drops which have passed clear through the aqueous phase are collected into an integral monomer phase which is preferably maintained as a layer in contact with the aqueous phase. In preferred practice, the aqueous emulsion of monomer is fed continuously into the aqueous medium not too close to the interface of the integral monomer layer and the aqueous layer. To compensate for the introduction of monomer emulsion, a corresponding amount of the aqueous reaction medium is usually withdrawn continuously so that the volume of aqueous phase in the reaction chamber remains the same. If desired, a lesser quantity of monomer emulsion may be fed in than is equal to the withdrawn aqueous medium and the difference is made up with water which may also contain emulsifying agent, polymerization catalyst and such other water-soluble ingredients as may be desired in the aqueous polymerization medium. The monomer emulsion may also contain polymerization catalyst and the other ingredients. The aqueous medium which is withdrawn is ordinarily taken out at a point behind the entering means for introduction of drops of monomer.

The rate of separation of the moving monomer drops into the integral monomer phase from the aqueous phase increases with the area of interface between the two phases. It is, therefore, generally desirable to have the interface positioned in the reaction chamber at a point of largest cross-sectional area. This can be achieved in a column-shaped reaction chamber by having the chamber fitted with a region of enlarged cross-section perpendicular to the axis of flow of drops. This enlarged portion will be located either at the top or bottom of the main column, as the case may require. The separation of the two phases may also be carried out in a separation chamber of adequate size for the interface which is apart from the reaction chamber. Although a column-shaped reaction chamber is generally preferred, the process may also be carried out in a reaction space having the horizontal dimensions greater than the height.

It is almost always desirable to circulate monomer from the integral monomer phase back to the point of introduction of the monomer drops. In other words, monomer is conducted in a circuit with passage through the aqueous medium. Preferably the recirculation conduit is arranged outside the reaction chamber and also is ordinarily fitted with a heat exchanger or cooler in order to effect cooling of the circulating monomer so as to absorb the exothermic heat of polymerization and thereby permit the aqueous polymerization medium to be maintained at a desired temperature.

The process is effected so that at least a majority of the monomer introduced as drops into the aqueous medium passes clear through the medium and is collected in the integral monomer phase. More suitably, at least 90% of the monomer introduced as drops passes clear through the aqueous medium. If desired, the rate of formation of polymer may be substantially the same or equal to the rate of introduction of monomer in emulsified form into the aqueous polymerization medium. This is a very advantageous mode of operation in many cases. In such event, it is to be noted that the feature of the monomer circulating as drops in the aqueous medium does not lose its utility; this circulating monomer functions to control temperature in the simple polymerization reactor and also provides gentle agitation of the aqueous reaction medium. In view of the foregoing explanation of flexibility of the process when operated in continuous fashion, it is evident that there can be wide variations in the relative rates of introduction of monomer as drops and of monomer in emulsified form. In all cases, however, at least the majority of the amount of monomer introduced as drops passes clear through the aqueous medium in a single passage and is collected into an integral monomer phase at the other end from the place of introduction.

In this specification and the accompanying claims, the term "drops" has been used to designate liquid globules of monomer which are of such size that they are clearly visible as distinct entities to the unaided human eye and are thus distinguishable from monomer "droplets," which is a term employed to designate the minute monomer globules present in the aqueous emulsion of monomer. The monomer drops usually have a diameter of about 0.1 to 1 centimeter or larger. Aside from a slight impetus of movement by pumping the monomer into contact with the aqueous medium, the movement of the monomer drops is caused only by the floating or sinking effect realized from the difference in density of the drops and the aqueous medium. The aqueous medium is otherwise free of mechanically induced agitation. The size of the monomer drops is so large that they are not subject to Brownian movement as is the case with emulsified monomer. In being drops, it also follows that the monomer composing the same is in liquid phase.

While for convenience of description the singular term "monomer" has been used herein, it is to be understood that mixtures of olefinically unsaturated compounds are equally applicable in the present improved process, and that use of such mixtures of compounds, two or more in number, give copolymer products. It is ordinarily preferred that the monomer or mixture of monomeric compounds passed as floating or sinking drops through the aqueous medium in the process be the same as that or those present and/or introduced in emulsified form.

The improved method of the invention is well suited for manufacture of polymers and copolymers of vinyl chloride, vinylidene chloride and butadiene but it can be employed as well to effect polymerization of any polymerizable olefinically unsaturated compound capable of existing as a drop in contact with the aqueous medium. Generally speaking, the present invention is advantageous in the polymerization of substances which may be polymerized by the known methods of emulsion polymerization, i. e., the polymerization methods carried out in the presence of an aqueous phase and an emulsifier and in which the reaction is started by formation of radicals in the aqueous phase. In general, monomer of the compound is substantially insoluble in the aqueous medium, as is the case with such suitable compounds as vinyl halides like vinyl chloride or bromide; vinyl esters such as vinyl acetate, propionate or butyrate; halogenated ethylenes such as tetrafluoroethylene, chlorotrifluoroethylene, vinylidene chloride or bromide; vinyl aromatics like styrene, methyl styrene, divinyl benzene or chlorostyrene; acrylate and methacrylate esters such as methyl, ethyl or butyl acrylate or methacrylate; vinyl ketones like methyl vinyl or isopropenyl ketone; olefins such as ethylene, propylene, butadiene-1,3, isoprene, or chloroprene; olefinically unsaturated esters like crotyl acetate, oleyl acetate, diallyl phthalate, diallyl maleate or ethylene glycol dimethacrylate; and similar compounds, as well as homologues. Preferably, a vinylidene compound is used which contains the group $CH_2=C<$ as is present in vinylidene chloride, methyl acrylate, vinyl chloride, butadiene-1,3 and styrene. The process enables production of excellent copolymers by polymerizing a mixture of olefinically unsaturated compounds, such as styrene with butadiene-1,3 present in a weight ratio of about 1:9 to 4:6 of the first to the second. In general, there is used a mixture of polymerizable, olefinically unsaturated compounds wherein at least 1% of each is present in the drops for preparation of copolymers.

Any of the various polymerization catalysts known to be suitable for use in polymerizing olefinically unsaturated compounds in an aqueous system is employed. The catalyst is used in amounts up to about 5%, usually between 0.1 and 1%, these percentages being by weight and based upon the aqueous phase. Water-soluble peroxy polymerization catalysts, such as hydrogen peroxide, sodium or potassium persulfate, percarbonate or perborate and tertiary butyl hydroperoxide, are very useful. Other catalysts can be used, such as benzoyl peroxide, acetyl peroxide, acetyl benzoyl peroxide, lauryl peroxide, tertiary butyl perbenzoate, acetone peroxide, etc., if they form part of the well known redox systems of polymerization catalyzers, especially when operating at below about 35° C. Suitable catalyst systems are also combinations of oxygen and salts of sulfurous acid. Furthermore, chain stoppers or chain transfer agents like lauryl mercaptan may be present with the polymerization catalyst, if desired.

As pointed out before, an emulsifying agent is present in the aqueous phase. For this purpose, any of the emulsifiers used in known processes are suitable whether their action be ionic or non-ionic. Thus there may be used such emulsifiers as sodium and/or potassium myristate, laurate, palmitate, oleate, stearate, rosinate and/or hydroabietate; or alkali metal alkyl or alkylene sulfates or sufonates such as sodium and/or potassium lauryl sulfate, cetyl sulfate, oleyl sulfonate, stearyl sulfonate, sulfonated Turkey red oil, sulfonated mineral oils, etc., as well as ammonium or ethanolamine salts thereof; salts of higher amines like lauryl amine, hydrochloride or stearyl amine hydrobromide; and also non-ionic emulsifiers such as described in U. S. 2,322,820. In all cases, it is preferred that the hydrocarbon radical of the emulsifying agent contain 10 to 20 carbon atoms. Various percentages of emulsifying agent can be successfully used. Best results are obtained when sufficient amount is present in the aqueous medium that the suspension of polymer is substantially stable. Larger amounts may be used, but are wasteful. The limits of the preferred amount vary with the particular emulsifying agent, the monomer or mixture of monomers being polymerized, and the extent of polymerization, i. e., the ultimate concentration of polymer in the aqueous medium. In general, the concentration of emulsifying agent falls within the range of about 0.05 to 2% of the aqueous medium. Although non-ionic emulsifiers are suitable for use, it is preferred to employ an ion-active emulsifying agent. With an ion-active emulsifier, there is employed in general between 0.01 and 0.2, particularly between 0.02 and 0.06 gram equivalents of emulsifier per kilogram of polymer ultimately present in dispersion. A gram equivalent is a number of grams which is equal to the molecular weight divided by the number of positive (or negative) elementary electric charges formed on ionization of a molecule. Thus in using sodium cetyl sulfonate as emulsifying agent for production of an aqueous dispersion containing 20% polymer, there is used a starting aqueous medium containing about 0.08 to 1.6%, particularly 0.16 to 0.5% of the emulsifying agent.

Stability of the polymer suspension to be prepared is achieved in the process of the invention by concentrations of the emulgators considerably lower than required for stability of the polymer suspension in known processes. In the polymerization of vinylidene compounds according to the invention, using a non-glass-lined stainless steel reactor and sulfonated aliphatic compounds with 10 to 20 carbon atoms in the molecule as emulsifiers, as little as 0.04 gram equivalent of the emulsifier is sufficient to avoid any polymer deposit. This is the more remarkable since direct contact of a polymer suspension with a metal wall generally promotes the formation of polymer deposits.

Although the temperature of operation in the polymerizing zone can vary during the course of the polymerization, it is preferred to maintain it substantially constant, and as explained before, this is conveniently accomplished by cooling the circulating monomer phase. However, in starting up the polymerization, it may be necessary to apply heat until the polymerization reaction is under way. Once polymerization has started, the temperature is kept constant by cooling, since the polymerization reaction is exothermic. A broad range of temperature is suitable for conducting the polymerization, but in general temperatures of about −20° C. to 90° C. are used, and very good results are obtained with the aqueous medium at about 15° C. to 170° C.

Since the process operates with liquid monomer, at least sufficient pressure is employed to achieve this state. In cases where the operating temperature is below the boiling point of the monomer, ordinary atmospheric pressure may be used. With operations at temperatures above the boiling point, it is, of course, necessary that sufficient superatmospheric pressure be used that the monomer is liquid, as is the case, for example, in polymerizing vinyl chloride at 25° C. High excesses of pressure may be used if desired.

The presence of oxygen generally tends to inhibit the rate of polymerization and, therefore, the reaction medium is preferably kept out of contact with oxygen by use of a closed apparatus and the reactor is purged free of oxygen in starting up.

The polymer product obtained as an aqueous dispersion may be separated from the aqueous medium by any of the well known coagulation procedures. Since the formed polymer dispersion is very stable, it is a useful product itself which may be stored and/or transported over extended periods of time for use in cloth coating operations, for example.

Apart from the preparation of homopolymers, the process of the invention is also very suitable for copolymerization. By this is meant the joint polymerization of two or more monomers. The invention renders it easy to conduct a copolymerization in such a manner that a homogeneous copolymer is formed, i. e., a copolymer consisting of macromolecules, all composed of monomer molecules in one and the same ratio.

In general different monomers, though they are present in the same concentration, are used up at different speeds in a copolymerization. The ratio in which monomers are present in the reaction mixture consequently shows a tendency to change. An alteration in the ratio of the monomer concentration in the reaction mixture in turn results in the composition of the macromolecules formed being subject to alteration, so that the copolymer becomes what is called heterogeneous.

It is known that in order to obtain homogeneous copolymer the ratio of the monomers in the reaction mixture must be kept constant, which can best be attained by admixing suitable quantities of all participating monomers, or by admixing suitable quantities of all monomers with the exception of the monomer which in proportion to the total quantity of that particular monomer present, is consumed most slowly. In the process according to the invention, this admixture can take place most efficiently in the monomer circulation line. Preferably a reservoir will be fitted in the circulation line in this case. The admixture of monomer then takes place preferably in this reservoir or in the part of the circulation line in front of the reservoir. When applying a reservoir the monomer can be admixed both continuously and intermittently.

The following example is given for the purpose of illustrating the inventive improvement, but it is to be understood that the invention is not to be construed as limited to details described therein.

*Example*

Polymerization of vinylidene chloride was carried out in a vertical cylindrical chamber having a diameter of 5.5 centimeters and a height of 60 centimeters. Into the cylinder was placed 425 cubic centimeters of vinylidene chloride along with an upper layer of 1000 cubic centimeters of an aqueous solution containing by weight 0.5% ammonium persulfate, 0.25% sodium sulfite, 0.25% sodium bicarbonate, and 0.5% sodium mersolate (sodium alkyl sulfonate obtained in known manner by treating saturated aliphatic hydrocarbons containing 10 to 20 carbon atoms with sulfur dioxide and chlorine, followed by alkaline saponification of the sulfochlorides thus formed). After the contents of the reactor had been brought to a temperature of 28° C., vinylidene chloride was fed at a rate of 4 liters per hour through a tube having an opening of 6 millimeters in diameter fitted into the top of the reactor. This monomer sank through the aqueous phase in drops of 1 to 5 millimeters in diameter and separated out from the aqueous phase to become a part of the integral monomer phase at the bottom. The monomer from the lower layer was transported back to the top continuously with a pump.

There was also fed to the bottom of the aqueous column 260 cubic centimeters per hour of an 0.8% aqueous solution of ammonium persulfate and 260 cubic centimeters per hour of an aqueous emulsion of vinylidene chloride. The monomer emulsion had a composition (in percentages by weight) of 40% vinylidene chloride, 0.8% sodium mersolate, 0.4% sodium sulfite, 0.4% sodium bicarbonate, and 58.4% water. The monomer emulsion was prepared by forming a jellied mixture of a concentrated aqueous solution of the emulsifying agent and then adding the solution of water containing the other ingredients to the jelly with agitation.

The aqueous phase was discharged from the top of the reactor at such a rate that the volume of aqueous phase therein remained constant. By cooling the circulating monomer in the external portion of the circuit the temperature of the contents of the reactor was maintained at 28± 1° C.

After a steady state of operation was attained, it was found that the rate of polymerization amounted on an average to 90 grams of polymer per liter of the dispersion per hour, and the withdrawn polymer emulsion contained 18% by weight of polymer. The quantity of circulating monomer passed through the aqueous phase in large drops was found not to have changed perceptibly in 16 hours.

For purposes of comparison, a test was carried out in which no emulsified monomer was supplied, but in which fresh monomer was added to the circulating monomer in order to compensate for the monomer converted to polymer. Otherwise the same polymerization recipe was used, and 500 cubic centimeters per hour of the aqueous phase was withdrawn from the top of the reactor while 500 cubic centimeters per hour of the original aqueous phase was fed into the bottom of the aqueous column. After a steady state was reached, it was found that the rate of polymerization amounted to only an average of 19 grams of polymer per liter of dispersion per hour, and the withdrawn polymer emulsion contained about 4% by weight of polymer.

We claim as our invention:

1. In a process for producing polymer of a vinylidene compound which is at least only partially miscible with water wherein drops of monomer of the vinylidene compound are continuously introduced into submerged contact with a vertical column of a liquid aqueous medium at polymer-producing temperature for said vinylidene compound, said aqueous medium containing a water-soluble peroxy polymerization catalyst and an emulsifying agent for formed polymer of said vinylidene compound; and wherein said drops are conducted through said column of aqueous medium while maintaining the rate of introduction of said monomer drops such that a majority of the introduced monomer passes clear through the aqueous medium in monomeric form, the movement of the drops through said aqueous medium being effected primarily by difference in density of said drops and the medium, which medium is free of mechanically induced agitation; and further wherein the drops of the vinylidene compound which have passed through the aqueous medium are collected into an integral monomer phase which is maintained in contact with the aqueous medium; the improvement which comprises also introducing continuously into said aqueous medium a substantial amount of an aqueous emulsion of said vinylidene compound.

2. The improvement as defined in claim 1 wherein the drops of monomer of the vinylidene compound conducted through the aqueous medium have a diameter of about 0.1 to 1 centimeter, and the droplets of monomeric vinylidene compound introduced as aqueous emulsion into the aqueous medium have a size not larger than about 0.01 millimeter.

3. The improvement as defined in claim 2 wherein the vinylidene compound is vinylidene chloride.

4. The improvement as defined in claim 2 wherein the vinylidene compound is vinyl chloride.

5. The improvement as defined in claim 2 wherein the vinylidene compound is butadiene-1,3.

6. In a process for production of polymer of a substantially water-insoluble vinylidene compound wherein drops of monomer of the vinylidene compound are introduced continuously into submerged contact with a vertical column of liquid aqueous medium containing a water-soluble persulfate salt as polymerization catalyst and emulsifying agent for formed polymer of the vinylidene compound, which liquid is maintained at polymer-producing temperature for the vinylidene compound; and wherein said drops are conducted through said column of aqueous medium while maintaining the rate of introduction of said monomer drops such that at least 90% of the so-introduced vinylidene compound passes clear through the aqueous phase in monomeric form, the movement of the drops through said aqueous medium being effected primarily by difference in density of said drops and the medium, which medium is otherwise free of mechanically induced agitation; and wherein the drops of the vinylidene compound which have passed through the aqueous medium are collected into an integral monomer phase which is maintained in contact with the aqueous medium; and further wherein monomeric vinylidene chloride is withdrawn continuously from the integral monomer phase and circulated continuously to effect the submerged contact of the drops of monomer of the vinylidene compound, the improvement which comprises also introducing continuously into said aqueous medium such an amount of said vinylidene compound in the form of an aqueous emulsion as to substantially equal the amount of monomer of the vinylidene compound converted into polymer in said aqueous medium.

7. The improvement as defined in claim 6 wherein the drops of monomer of the vinylidene compound conducted through the aqueous medium have a diameter of about 0.1 to 1 centimeter, and the droplets of monomeric vinylidene compound introduced as aqueous emulsion into the aqueous medium have a size not larger than about 0.01 millimeter.

8. The improvement as defined in claim 7 wherein the vinylidene compound is vinylidene chloride.

9. The improvement as defined in claim 7 wherein the vinylidene compound is vinyl chloride.

10. In a process for producing copolymer of butadiene-1,3 and styrene wherein drops of a mixture of monomers of butadiene-1,3 and styrene are continuously introduced into submerged contact with a vertical column of a liquid aqueous medium at copolymer-producing temperature for butadiene-1,3 and styrene, said aqueous medium containing a water-soluble peroxy polymerization catalyst and an emulsifying agent for formed copolymer of butadiene-1,3 and styrene; and wherein said drops are conducted through said column of aqueous medium while maintaining the rate of introduction of said monomer drops such that a majority of the introduced monomers passes clear through the aqueous medium in monomeric form, the movement of the drops through said aqueous medium being effected primarily by difference in density of said drops and the medium, which medium is free of mechanically induced agitation; and further wherein the drops of butadiene-1,3 and styrene which have passed through the aqueous medium are collected into an integral monomer phase which is maintained in contact with the aqueous medium; the improvement which comprises also introducing continuously into said aqueous medium a substantial amount of an aqueous emulsion of butadiene-1,3 and styrene.

11. The improvement as defined in claim 10 wherein the drops of the mixture of monomers of butadiene-1,3 and styrene conducted through the aqueous medium have a diameter of about 0.1 to 1 centimeter, and the droplets of monomeric butadiene-1,3 and styrene have a size not larger than about 0.01 millimeter.

12. The improvement as defined in claim 10 wherein the weight ratio of the monomeric styrene to the monomeric butadiene-1,3 is from about 1:9 to 4:6.

References Cited in the file of this patent

UNITED STATES PATENTS

| | | |
|---|---|---|
| 2,068,424 | Mark | Jan. 19, 1937 |
| 2,326,326 | Breedis | Aug. 10, 1943 |
| 2,363,951 | Fikentscher | Nov. 28, 1944 |
| 2,570,027 | Dunlop | Oct. 2, 1951 |
| 2,587,562 | Wilson | Feb. 26, 1952 |
| 2,618,626 | Van Dijk | Nov. 18, 1952 |

FOREIGN PATENTS

| | | |
|---|---|---|
| 612,331 | Great Britain | Nov. 11, 1948 |